April 14, 1959  E. V. BROWNE  2,881,993
ELASTIC CONTROL STICK
Filed March 11, 1955  2 Sheets-Sheet 1
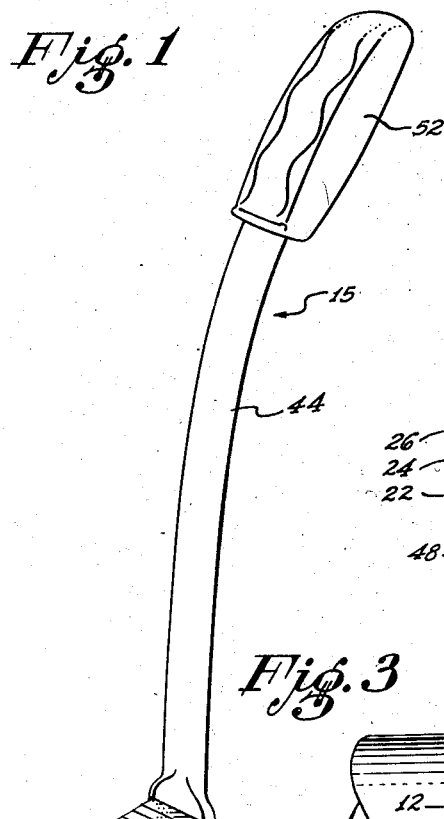
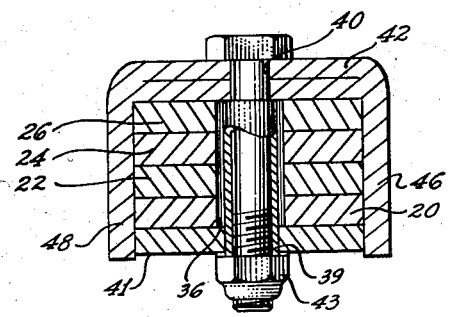
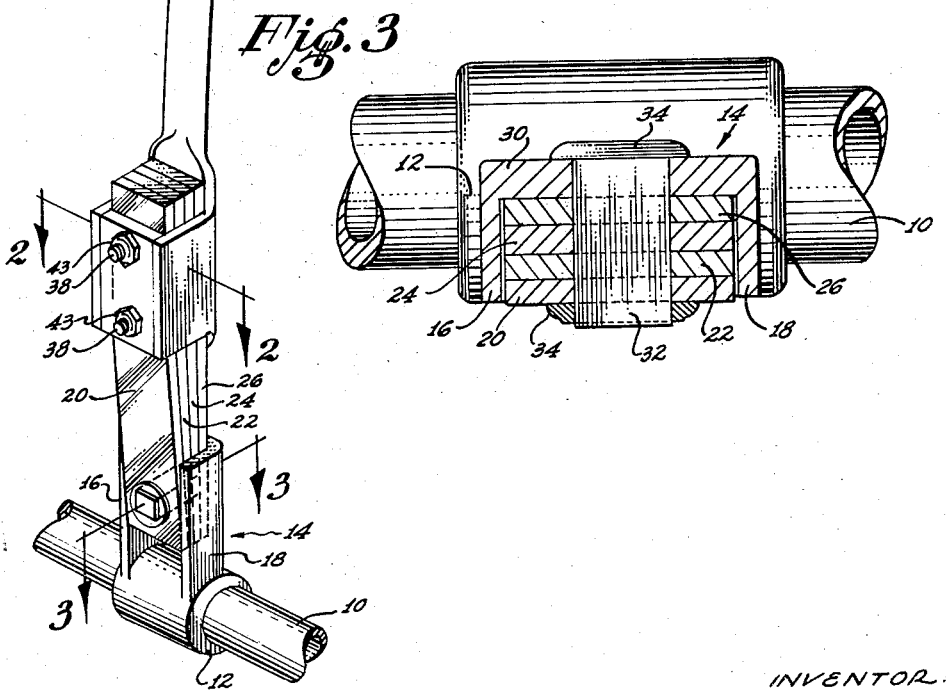
INVENTOR:
Eugene V. Browne
By Herbert E. Metcalf
His Patent Attorney April 14, 1959  E. V. BROWNE  2,881,993
ELASTIC CONTROL STICK
Filed March 11, 1955  2 Sheets-Sheet 2
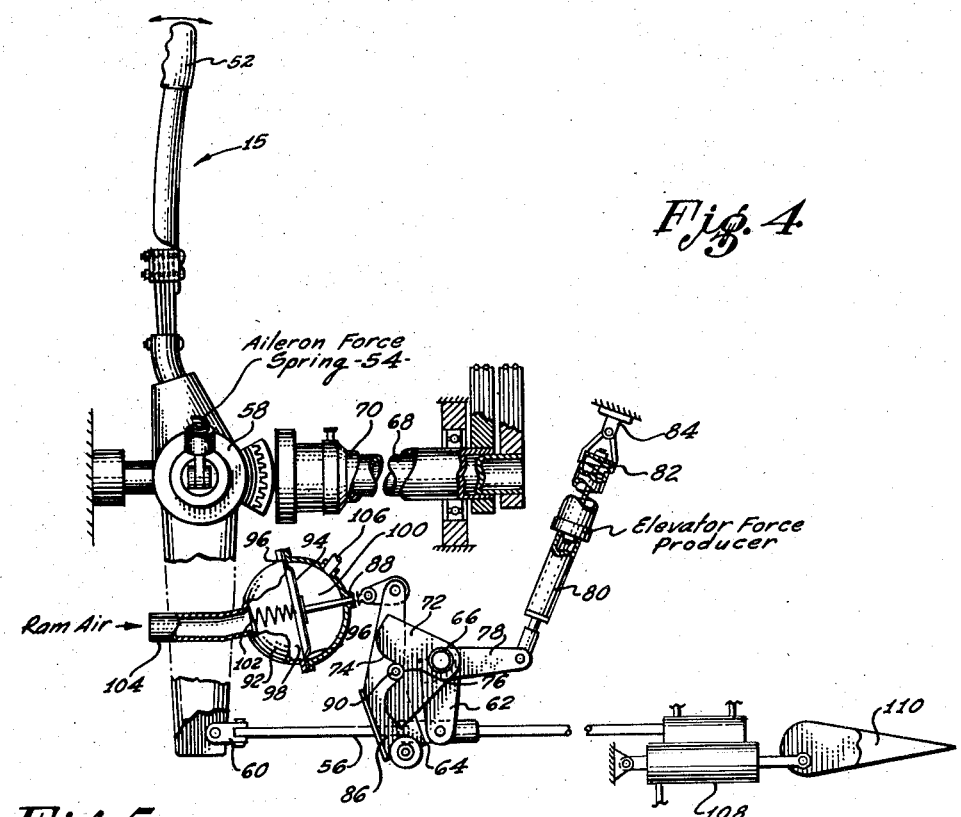
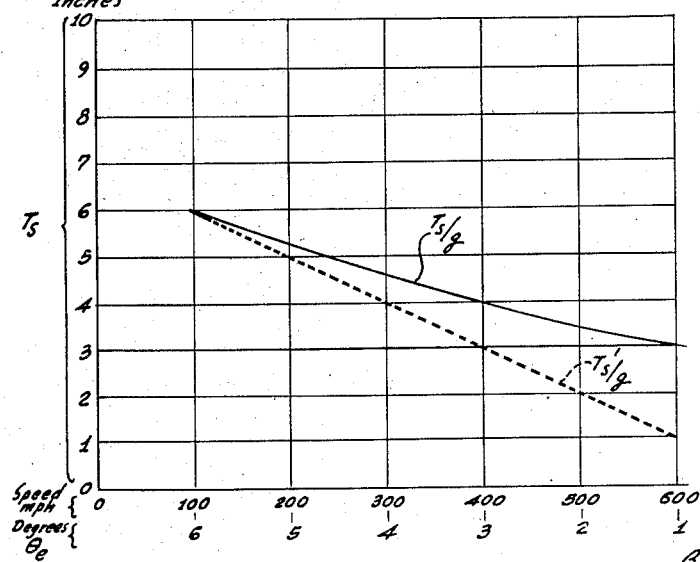
INVENTOR:
Eugene V. Browne
His Patent Attorneys

United States Patent Office 2,881,993
Patented Apr. 14, 1959

2,881,993

ELASTIC CONTROL STICK

Eugene V. Browne, Los Angeles, Calif., assignor to Northrop Aircraft, Inc., Hawthorne, Calif., a corporation of California Application March 11, 1955, Serial No. 493,659

13 Claims. (Cl. 244—83)

This invention has to do with aircraft and more particularly control sticks incorporated as a part thereof. Some aircraft are controlled throughout by full powered devices of a hydraulic or electrical nature for the reason that at elevated speeds, near and beyond the speed of sound, the airstream over the controlled surfaces, in the absence of said full powered devices, is so great that the stick would be rendered entirely immovable. With the introduction of full powered control devices the pilot's "feel" is removed and it is necessary to return to the system a synthetic or artificial but accurate "feel" usually in the nature of a bellows actuated by ram air to provide a stick force increasing with airspeed. The pilot, as a general rule, does not have a sufficiently acute sense of touch to move a control stick an infinitely fine amount to obtain a desired attitude control result at top speeds.

An object of this invention is to provide a control stick that will enable the pilot of an aircraft to move the stick through a maximum path of travel and still retain a maximum of control.

Another object of this invention is to provide an elastic control stick that is of simple design and construction and having such dimensions that no more space will be occupied in the pilot's compartment or cockpit than those control sticks presently or heretofore used.

A yet further object of this invention is to provide a control stick that is desensitized at elevated speeds in an effort to simulate the control stick travel at low speeds.

Figure 1 is a fragmentary, perspective view having embodied therein the present invention.

Figure 2 is an enlarged, cross-sectional view taken on line 2—2 in Figure 1 looking in the direction indicated.

Figure 3 is an enlarged, cross-sectional view taken on line 3—3 in Figure 1 looking in the direction indicated.

Figure 4 is a side view, partly in section and partly diagrammatic, of one type of control stick assembly having embodied therein the control stick illustrated in Figure 1 and showing a stick force producer connected to a hydraulic servo valve and related control surfaces.

Figure 5 is a graph illustrating the relationship of rigid and elastic control sticks at various speeds.

Referring to Figures 1 to 3 of the drawings for a more detailed description of one form of the present invention, 10 designates a rotatable rod or shaft that is interconnected to certain controlled surfaces of an aircraft, to be hereinafter referred to in greater detail. Secured to the shaft 10 is a control stick broadly designated 15 comprising a collar 12 having integral therewith an elongated, U-shaped bracket 14. Located between the legs 16 and 18 of the bracket 14, and spaced therefrom, are the ends of a plurality of elongated leaf springs 20, 22, 24, and 26. Extending through a square opening in each leaf spring 20, 22, 24, and 26 and the bight 30 of bracket 14 to secure the former to the latter is a square stud 32. Secured to the stud 32 in opposed relation to the stud head 34, and in contacting relationship with leaf spring 20, is a washer 34. The extreme ends of the springs 20, 22, 24, and 26 are spaced from the collar 12. The square stud and opening construction just referred to is to render the springs secure in the bracket 14 and to prevent any rotation or slipping.

Constructed in and adjacent the end of each spring 20, 22, 24, and 26, in opposed relation to the ends in bracket 14, are openings 36. A pair of studs 38 extend through bushings 39 located in the openings 36 and a similar but smaller opening 40 constructed in the flattened portion 42 of the elongated and arcuate rod 44. The inside diameter of openings 36 is greater than the outside diameter of bushings 39 in order that the springs 20, 22, 24, and 26 may slide relative to each other when the springs are flexed in one direction or the other.

The bushings 39 and studs 38 also extend through an opening in plate 41. Bolts 43 are applied to the ends of the studs and tension is applied thereto in order to hold the springs 20, 22, 24, and 26 in a reasonably rigid condition yet permit a certain amount of movement as the springs are flexed.

Secured, by welding or other equally applicable means, to the flattened portion 42 of the rod 44 are a pair of spaced apart plates 46 and 48 for retaining the springs 20, 22, 24, and 26 within a restricted area.

Located on the extreme free end of the rod 44 is a hand grip 52.

Attention is directed to Figure 4 of the drawings. The structure shown therein, with the exception of the control stick 15, is illustrated, described and claimed in Patent 2,684,215 issued to Ashkenas.

Stick centralizing forces are applied in aileron movements of the stick by a two-way aileron centralizing spring assembly 54. Centering forces are applied to the stick 15 in elevation directions through a push rod 56 rotatably connected to the lower part of the stick yoke 58 by a universal fitting 60 and extending aft to similarly connect to a spoke 62 by means of a second universal fitting 64. Spoke 62 is attached to a support shaft 66 mounted on bearings on each side of torque tubes 68 and 70.

A cam sector 72 is mounted on one end of support shaft 66 with a cam surface 74 facing forward, the cam having a central indent portion 76. Opposite the indent 76 of the cam, the support shaft carries a force lever 78 rotatably connected to a spring operating rod 80 entering an elevator force producer cylinder 82 attached to the airframe by a support 84.

Located in front of cam sector 72 a cam lever 86 is rotatably attached below to the airframe and extends upwardly to rotatably connect to a bellows rod 88 extending forwardly. Cam lever 86, between its ends, also carries a cam follower 90 rolling on cam surface 74 so that pressure on bellows rod 88 directed aft will force the cam follower 90 into the central indent portion 76 of cam surface 74 and thus rotate support shaft 66 if the cam follower is not in the indent portion.

In flight, the force on the bellows rod 88 is supplied by the dynamic air flow by means of a bellows casing 92 and containing a diaphragm 94 attached to the casing 92 by flexible edges 96, this diaphragm dividing the casing into a pressure chamber 98 and a static chamber 100. Bellows rod 88 extends through the casing 92, and 94 is attached at a right angle thereto inside the casing 92. A diaphragm spring 102 presses the diaphragm aft to insure contact of follower 90 with cam surface 74 when the aircraft is not in flight. Pressure chamber 98 is connected by ram air tube 104 to an air scoop so that pressures in accordance with air speed can be produced in pressure chamber 98. The static chamber 100 is connected by static line 106 to a position of static or negative pressure on the outside of the aircraft. The bellows action applies a synthetic feel to the control stick.

The operation of the elastic control stick is as follows, and attention is directed to Figures 4 and 5.

The horizontal divisions of the graph refer to the speed of an aircraft and the degrees of change in the elevators thereon. The vertical divisions refer to inches of movement of the control stick. The symbol $T_s$ represents stick travel; the symbol $T_{s/g}$ represents stick travel per $g$'s of force; the symbol $\theta_e$ represents degrees of elevator change. The solid line represents the rigid control stick, and the dotted line the elastic. The graph as illustrated applies to an aircraft having hydraulic and/or electrical automatic controls 108, interconnected to push rod 56, to which is connected the elevators 110. The control stick 15, as illustrated in Figure 4, is included in the system and is interconnected to the automatic controls 108 through the medium of rod 56 as schematically illustrated.

Assume that a pilot of an aircraft traveling 600 miles an hour and having a fifty pound ram air force imposed on the diaphragm 94 of the bellows is required to move the elevators 110 one degree. In order to accomplish this result he must apply a force of fifty pounds to a rigid stick to move it approximately one inch. However, if the control stick is elastic and under the identical conditions, then the stick is moved three inches. The pilot is permitted a larger movement to acquire the same result which is accomplished in the following manner: First, the fifty pound force imposed in pressure chamber 98 and against the diaphragm 94 in the bellows must be overcome before the elevators 110 may be moved. The springs 20, 22, 24, and 26 have no stored energy therein, therefore an energy of fifty pounds must be obtained. This is done by moving the stick 15 two inches in the direction desired before stick motion will be transmitted to elevators 110, the springs 20, 22, 24, and 26 acquiring and having a fifty pound force stored therein. The force or energy now stored in the control stick 15, in the pressure chamber 98, and against the diaphragm 94 is equal. Therefore any further movement of control stick 15 will be transmitted through stick yoke 58, push rod 56, to automatic controls 108 and elevators 110, and result in overcoming the force against the diaphragm 94, through spoke 62, cam sector 72, lever 86, bellows rod 88, to cause movement of the elevators 110 one degree.

Further assume the pilot is required to move the elevator 110 two degrees while the aircraft is traveling at 500 miles an hour and a thirty-five pound force is imposed on diaphragm 94. In the case of the rigid stick, it is moved two inches, whereas in the elastic stick it is moved approximately three and a half inches in the same manner as described for flying conditions of 600 miles an hour.

It may be seen as the speed of the aircraft is decreased, the curves representing the rigid and elastic control sticks merge into a common curve and there is no apparent difference between the movement of the two. In other words the force imposed on the diaphragm 94 is not of sufficient magnitude to cause the leaf springs to bend.

On the other hand, as the speeds increase the differential between the curves of the rigid and elastic control sticks increases permitting the pilot greater movement of the elastic stick at elevated speeds.

Therefore, when the pilot of a high speed aircraft wishes to change the attitude thereof by causing to be operated certain control surfaces, a movement is imposed on the control stick 15. This movement is in turn transmitted to the leaf springs 20, 22, 24, and 26, which as a result thereof slide relative to each other. A portion of the movement is thereby absorbed in the springs due to the buildup of required energy and that portion beyond the energy requirement is transmitted through the bracket 14 to the rod 10 and finally into the controlled surfaces of the aircraft. Due to this construction the pilot is capable of obtaining a reasonably broad motion of the control stick 15 while at the same time obtaining a reasonably small movement of the controlled surfaces. The aforedescribed construction will compensate for the pilot's lack of an acute sense of touch and control.

It is to be understood that the graph of Figure 5 is not to be construed as a limitation on the invention, nor are the divisions applied intended to be a true, exact and accurate representation of the actual conditions. The divisions as applied are arbitrary for the reason that no single graph would or could be a true representation of conditions for all aircraft or for any two apparently identical aircraft. Each aircraft of the same type has characteristics peculiar to itself and aircraft of different types are also subject to dissimilar conditions.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; an elongated handle; and manually actuated elastic means between and interconnecting the rod and handle and influenced by the force producer to control the degree of flexing of said means to obtain a determinable amount of change in the controlled surfaces of an aircraft.

2. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; a bracket on said rod; manually actuated elastic means between and connecting the handle and bracket and influenced by the force producer to control the degree of flexing of said means to obtain a determinable amount of change in the controlled surfaces of an aircraft.

3. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; and manually actuated elastic means on said rod and influenced by the force producer to control the degree of flexing of said means to obtain a determinable amount of change in the controlled surfaces of an aircraft; said elastic means being at least one spring.

4. In the control system of an aircraft having a force producer therein creating a force increasing with the airspeed of an aircraft for communicating aircraft attitude to the pilot, an elastic control stick comprising a rotatable rod interconnected to certain controlled surfaces of an aircraft and in series with said force producer; and manually actuated elastic means on said rod and influenced by the force producer to control the degree of flexing of said means to obtain a determinable amount of change in the controlled surfaces of an aircraft; said elastic means being a plurality of leaf springs.

5. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; an elongated handle; manually actuated elastic means between and interconnecting the rod and handle and influenced by the force producer to control the degree of flexing of said means to obtain a determinable amount of change in the controlled surfaces of an aircraft; and elements for securing said elastic means to said handle.

6. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; an elongated handle; manually actuated elastic means between and interconnecting the rod handle and influenced by the force producer to control the degree of flexing of said means to obtain a determinable amount of change in the controlled surfaces of an aircraft; and elements for securing said elastic means to said handle; said elastic means being at least one spring.

7. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; an elongated handle; manually actuated elastic means between and interconnecting the rod and handle and influenced by the force producer to control the degree of flexing of said means to obtain a determinable amount of change in the controlled surfaces of an aircraft; and elements for securing said elastic means to said handle; said elastic means being a plurality of leaf springs.

8. In the control system of an aircraft having a force producer therein creating a force increasing with the airspeed of an aircraft for communicating aircraft attitude to the pilot, an elastic control stick comprising a rotatable rod interconnected to certain main controlled surfaces of an aircraft and in series with said force producer; a bracket on said rod; manually actuated elastic means between and connecting the handle and bracket and influenced by the force producer to control the degree of flexing of said means to obtain a determinable amount of change in the controlled surface of an aircraft; and elements for securing said elastic means to said handle.

9. In an aircraft the combination of a piloting handle; an attitude main control surface; a surface actuating linkage connected to said surface; a force producer creating a force increasing with the airspeed of said aircraft; said force producer being connected to said linkage; and an elastic connection forming the sole connection between said handle and said linkage.

10. In an aircraft the combination of a piloting handle; an attitude main control surface; a surface actuating linkage connected to said surface; a force producer creating a force increasing with the airspeed of said aircraft; said force producer being connected to said linkage; and an elastic connection forming the sole connection between said handle and said linkage; the elasticity of said elastic connection being coordinated with the force generated by said force producer to cause flexing of said connection by the pilot at elevated air speeds.

11. In an aircraft the combination of a piloting handle; an attitude main control surface; a surface actuating linkage connected to said surface; a force producer creating a force increasing with the airspeed of said aircraft; said force producer being connected to said linkage; and an elastic connection forming the sole connection between said handle and said linkage; the degree of flexing of said elastic connection increasing with an increase of force produced by said force producer.

12. In an aircraft the combination of a piloting handle; an attitude main control surface; a surface actuating linkage connected to said handle; and an elastic connection forming the sole connection between said handle and said linkage.

13. In an aircraft the combination of a piloting handle; an attitude main control surface; a surface actuating linkage connected to said handle; and an elastic connection forming the sole connection between said handle and said linkage; the elasticity of said elastic connection being governed by the airspeed attained by said aircraft.

References Cited in the file of this patent

UNITED STATES PATENTS

| | | |
|---|---|---|
| 977,224 | Robinson et al. | Nov. 29, 1910 |
| 1,755,928 | Lievre | Apr. 22, 1930 |
| 2,583,828 | Gerstenberger | Jan. 29, 1952 |
| 2,684,215 | Ashkenas | July 20, 1954 |

FOREIGN PATENTS

| | | |
|---|---|---|
| 434,268 | France | Jan. 30, 1912 |
| 569,290 | Great Britain | Sept. 7, 1944 |